US012726612B2

(12) United States Patent
Zhu et al.

(10) Patent No.: US 12,726,612 B2
(45) Date of Patent: Sep. 1, 2026

(54) METHOD, APPARATUS, AND MEDIUM FOR VIDEO PROCESSING

(71) Applicant: Bytedance Inc., Los Angeles, CA (US)

(72) Inventors: Weijia Zhu, Los Angeles, CA (US); Yuwen He, Los Angeles, CA (US); Li Zhang, Los Angeles, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 18/957,496

(22) Filed: Nov. 22, 2024

(65) Prior Publication Data

US 2025/0088625 A1 Mar. 13, 2025

Related U.S. Application Data

(63) Continuation of application No. PCT/US2023/067305, filed on May 22, 2023.

(60) Provisional application No. 63/344,926, filed on May 23, 2022.

(51) Int. Cl.

| | |
|---|---|
| ***H04N 19/00*** | (2014.01) |
| ***H04N 19/105*** | (2014.01) |
| ***H04N 19/139*** | (2014.01) |
| ***H04N 19/159*** | (2014.01) |
| ***H04N 19/167*** | (2014.01) |

(Continued)

(52) U.S. Cl.
CPC ......... *H04N 19/105* (2014.11); *H04N 19/139* (2014.11); *H04N 19/159* (2014.11); *H04N 19/167* (2014.11); *H04N 19/176* (2014.11); *H04N 19/96* (2014.11)

(58) Field of Classification Search
CPC .. H04N 19/105; H04N 19/139; H04N 19/159; H04N 19/167; H04N 19/176; H04N 19/96; H04N 19/11; H04N 19/157; H04N 19/593
See application file for complete search history.

(56) References Cited

U.S. PATENT DOCUMENTS 4,783,698 A * 11/1988 Harney .................. H04N 7/122 386/E9.052
5,644,306 A * 7/1997 Brent ...................... H03M 7/42 341/67

(Continued)

OTHER PUBLICATIONS

International Search Report for PCT/US2023/067305, mailed on Nov. 3, 2023, 4 pages.

*Primary Examiner* — Frank F Huang
(74) *Attorney, Agent, or Firm* — Astute IP Law Group

(57) ABSTRACT

Embodiments of the present disclosure provide a solution for video processing. A method for video processing is proposed. The method comprises: determining, for a conversion between a current block of a video and a bitstream of the video, that a first prediction mode is applied to the current block, deriving, in the first prediction mode, prediction samples of the current block based on reference values in a virtual buffer that are determined by a block vector for the current block; performing the conversion based on the prediction samples; determining a set of blocks from a plurality of blocks of the same video region based on coded information of the plurality of blocks, the plurality of blocks being coded before the current block; and updating the virtual buffer based on the set of blocks.

20 Claims, 10 Drawing Sheets

(51) Int. Cl.
*H04N 19/176* (2014.01)
*H04N 19/96* (2014.01)

(56) References Cited

U.S. PATENT DOCUMENTS 5,949,441 A * 9/1999 Ristau .................. H04N 19/423 348/715
6,963,612 B2 * 11/2005 Haddad .............. H04N 21/4147 348/E5.005
7,130,265 B1 * 10/2006 Sumida ............ H04N 21/23602 370/428
7,230,986 B2 * 6/2007 Wise ....................... G06F 12/04 711/E12.003
7,394,828 B1 * 7/2008 Wu ........................ H04J 3/1611 370/476
8,682,108 B2 * 3/2014 Tian ....................... G06V 10/25 382/294
8,976,816 B1 * 3/2015 Mok ................... H04L 12/6418 370/512
9,270,299 B2 * 2/2016 Luby ..................... H04L 1/0086
9,367,746 B2 * 6/2016 Ishihara ................. G06V 40/23
9,767,529 B1 * 9/2017 Liu ...................... H04N 19/433
2001/0043603 A1 * 11/2001 Yu ............................ H04L 9/40 370/469
2002/0174317 A1 * 11/2002 Schroeder ............... G06F 12/04 711/201
2003/0033417 A1 * 2/2003 Zou .................... H04N 21/4122 709/227
2003/0120992 A1 * 6/2003 Glaise ................. H03M 13/091 714/781
2005/0168478 A1 * 8/2005 Meroth .................... G09G 5/02 345/589
2006/0256851 A1 * 11/2006 Wang ............. H04N 21/234327 375/E7.011
2007/0086481 A1 * 4/2007 Klemets ............. H04N 21/6437 375/E7.025
2007/0189614 A1 * 8/2007 Cheng .................... H04N 19/42 375/E7.093
2008/0109562 A1 * 5/2008 Ramakrishnan ........ H04L 69/18 709/250
2008/0222370 A1 * 9/2008 Archibald ........... G06F 9/30018 711/E12.001
2011/0268194 A1 * 11/2011 Nagano ............ H04N 21/23614 375/E7.076
2012/0020413 A1 * 1/2012 Chen ...................... H04N 19/61 375/240.26
2012/0033039 A1 * 2/2012 Sasaki .................. H04N 13/161 348/E13.001
2013/0022119 A1 * 1/2013 Chien .................. H04N 19/147 375/E7.123
2013/0329006 A1 * 12/2013 Boles ..................... H04N 1/482 348/42
2015/0181211 A1 * 6/2015 He ......................... H04N 19/86 375/240.02
2017/0164033 A1 * 6/2017 Tsukagoshi .......... H04N 21/436
2022/0132105 A1 * 4/2022 Xu ....................... H04N 19/132
2023/0135007 A1 * 5/2023 Xu ....................... H04N 19/176 375/240.02

* cited by examiner

METHOD, APPARATUS, AND MEDIUM FOR VIDEO PROCESSING

CROSS REFERENCE TO RELATED APPLICATIONS

This application is a continuation of International Application No. PCT/US2023/067305, filed on May 22, 2023, which claims the benefit of U.S. Provisional Application No. 63/344,926, filed on May 23, 2022. The entire contents of these applications are hereby incorporated by reference in their entireties.

FIELDS

Embodiments of the present disclosure relates generally to video processing techniques, and more particularly, to intra block copy (IBC) mode.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency and coding quality of video coding techniques is generally expected to be further improved.

SUMMARY

Embodiments of the present disclosure provide a solution for video processing.

In a first aspect, a method for video processing is proposed. The method comprises: determining, for a conversion between a current block of a video and a bitstream of the video, that a first prediction mode is applied to the current block, deriving, in the first prediction mode, prediction samples of the current block based on reference values in a virtual buffer that are determined by a block vector for the current block; wherein reference values in the virtual buffer are derived from blocks of sample values of a same video region of the current video block; performing the conversion based on the prediction samples; determining a set of blocks from a plurality of blocks of the same video region based on coded information of the plurality of blocks, the plurality of blocks being coded before the current block; and updating the virtual buffer based on the set of blocks.

According to the method in accordance with the first aspect of the present disclosure, the virtual buffer for the first prediction mode is updated based on coded information. Compared with the conventional solution, the proposed method can advantageously update the virtual buffer adaptively. Thereby, the coding efficiency and coding quality can be improved.

In a second aspect, another method for video processing is proposed. The method comprises: obtaining, for a conversion between a current block of a video and a bitstream of the video, a merge list for the current block; reordering merge candidates in the merge list based on coded information of the merge candidates; and performing the conversion based on the reordered merge candidates.

According to the method in accordance with the second aspect of the present disclosure, merge candidates in the merge list are reordered based on coded information. Compared with the conventional solution, the proposed method can advantageously reorder the merge candidates in the merge list, so as to improve the coding efficiency and coding quality.

In a third aspect, an apparatus for video processing is proposed. The apparatus comprises a processor and a non-transitory memory with instructions thereon. The instructions upon execution by the processor, cause the processor to perform a method in accordance with the first aspect of the present disclosure.

In a fourth aspect, a non-transitory computer-readable storage medium is proposed. The non-transitory computer-readable storage medium stores instructions that cause a processor to perform a method in accordance with the first aspect of the present disclosure.

In a fifth aspect, another non-transitory computer-readable recording medium is proposed. The non-transitory computer-readable recording medium stores a bitstream of a video which is generated by a method performed by an apparatus for video processing. The method comprises: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; and updating the virtual buffer based on the set of blocks.

In a sixth aspect, a method for storing a bitstream of a video is proposed. The method comprises: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; updating the virtual buffer based on the set of blocks; and storing the bitstream in a non-transitory computer-readable recording medium.

In a seventh aspect, another non-transitory computer-readable recording medium is proposed. The non-transitory computer-readable recording medium stores a bitstream of a video which is generated by a method performed by an apparatus for video processing. The method comprises: obtaining a merge list for a current block of the video; reordering merge candidates in the merge list based on coded information of the merge candidates; and generating the bitstream based on the reordered merge candidates.

In an eighth aspect, a method for storing a bitstream of a video is proposed. The method comprises: obtaining a merge list for a current block of the video; reordering merge candidates in the merge list based on coded information of the merge candidates; generating the bitstream based on the reordered merge candidates; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
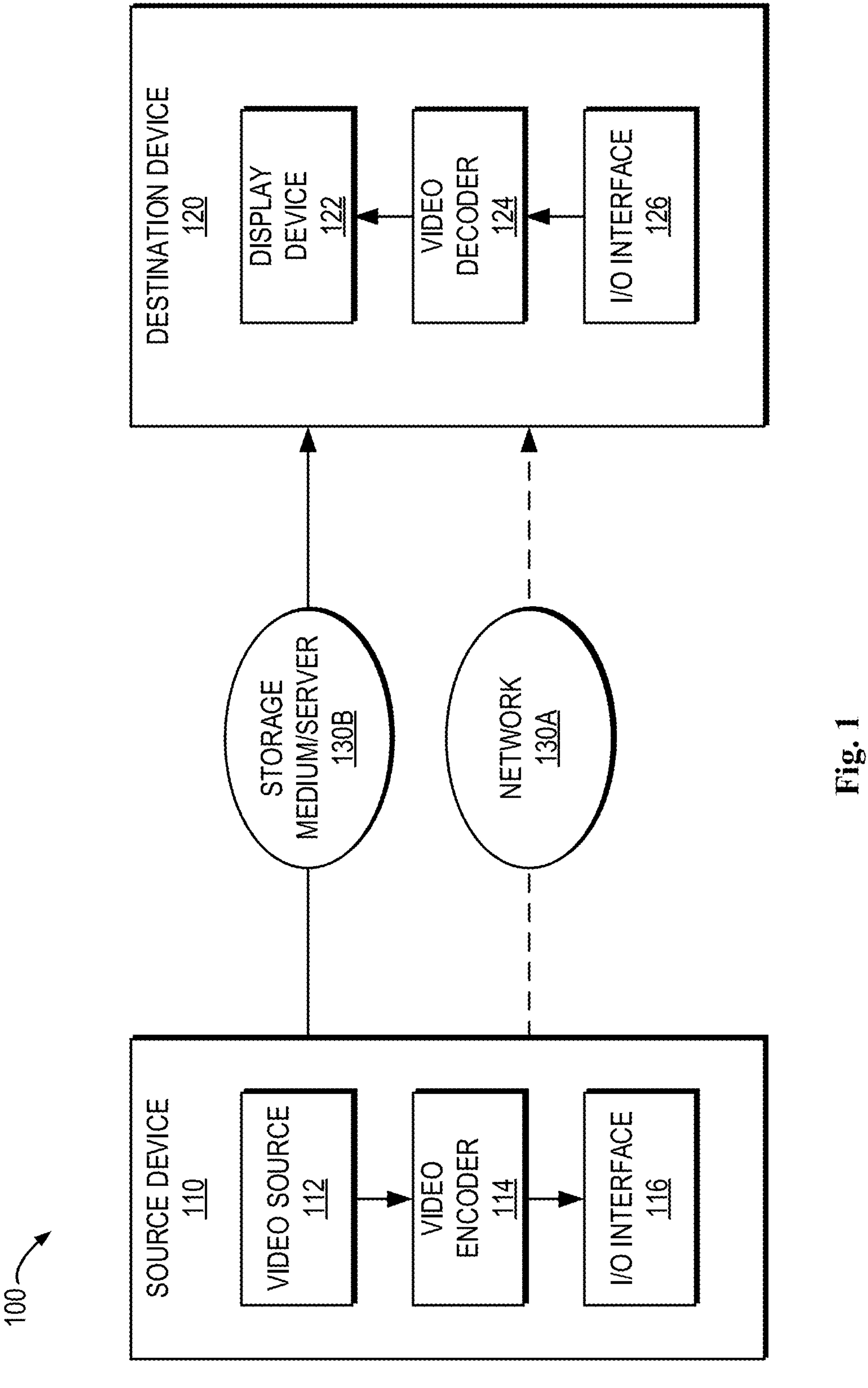
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
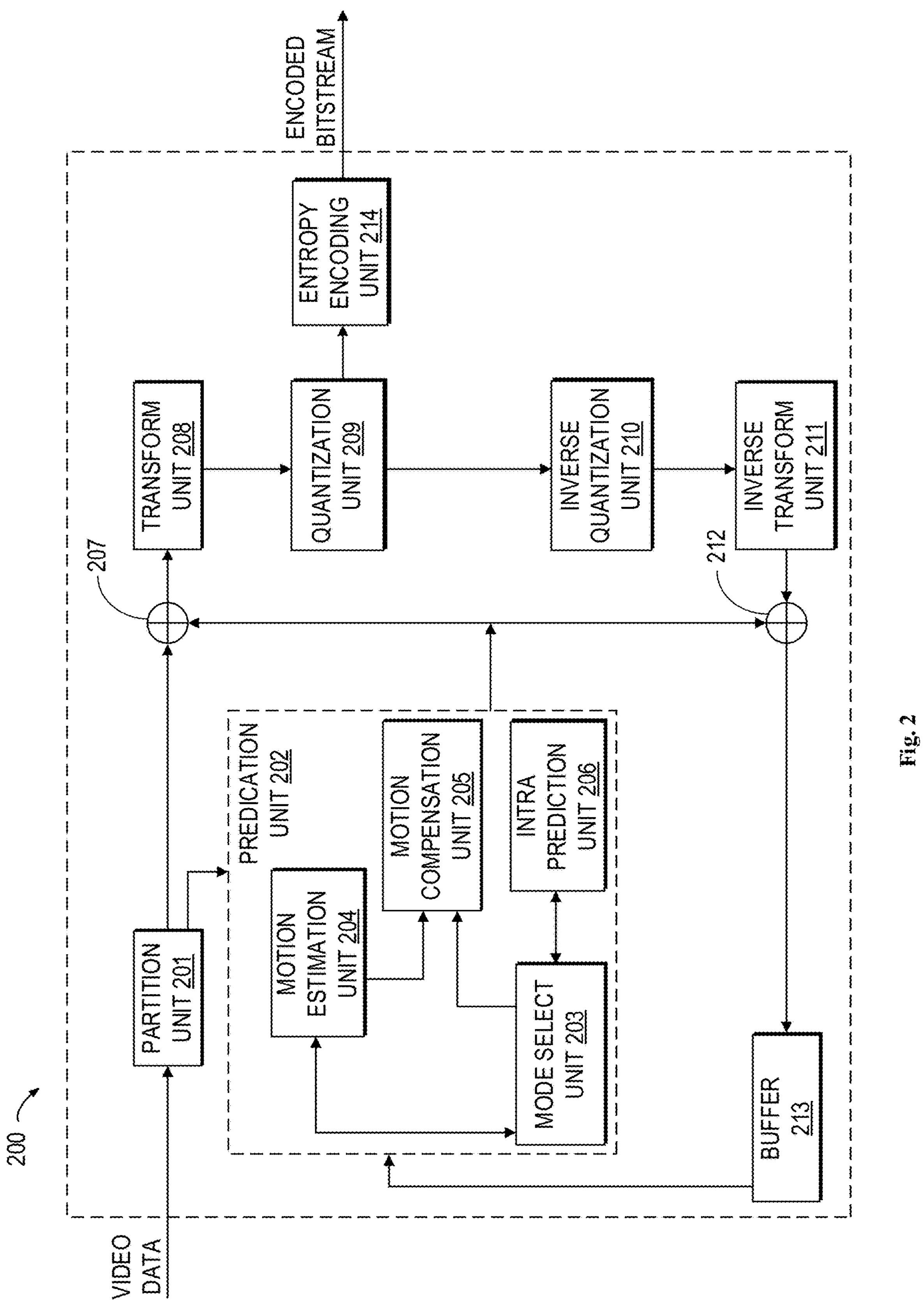
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter prediction (CIIP) mode in which the prediction is based on an inter prediction signal and an intra prediction signal. The mode select unit 203 may also select a resolution for a motion vector (e.g., a sub-pixel or integer pixel precision) for the block in the case of inter-prediction.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
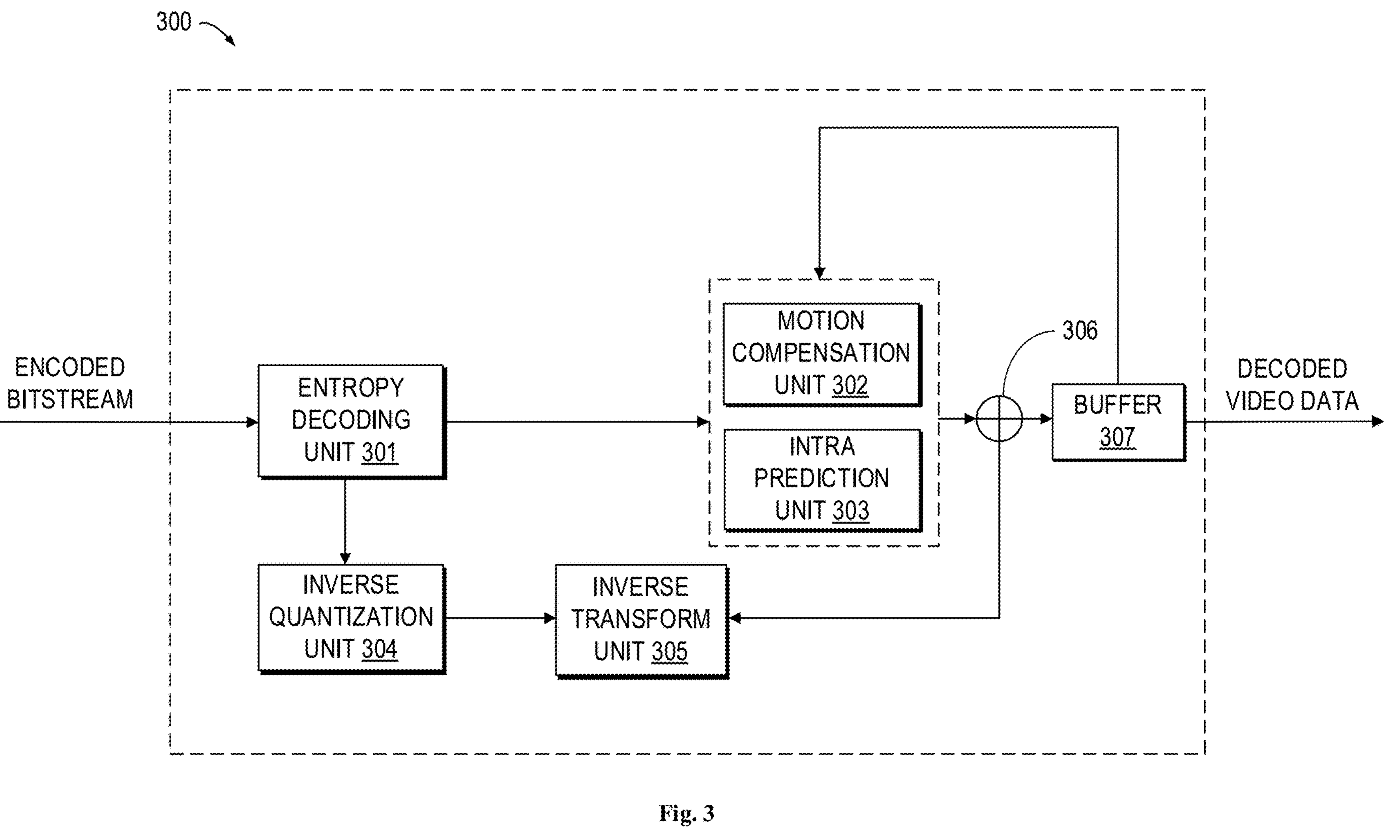
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra prediction and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1 Brief Summary

This disclosure is related to video coding technologies. Specifically, it is related to the intra block copy in video coding. It may be applied to the existing video coding standard like HEVC, or VVC (Versatile Video Coding) standard, or all other video coding standards. It may be also applicable to future video coding standards or video codec.

2 Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Intra Block Copy (IBC)

2.1.1 General Concept of IBC

Figure 4:
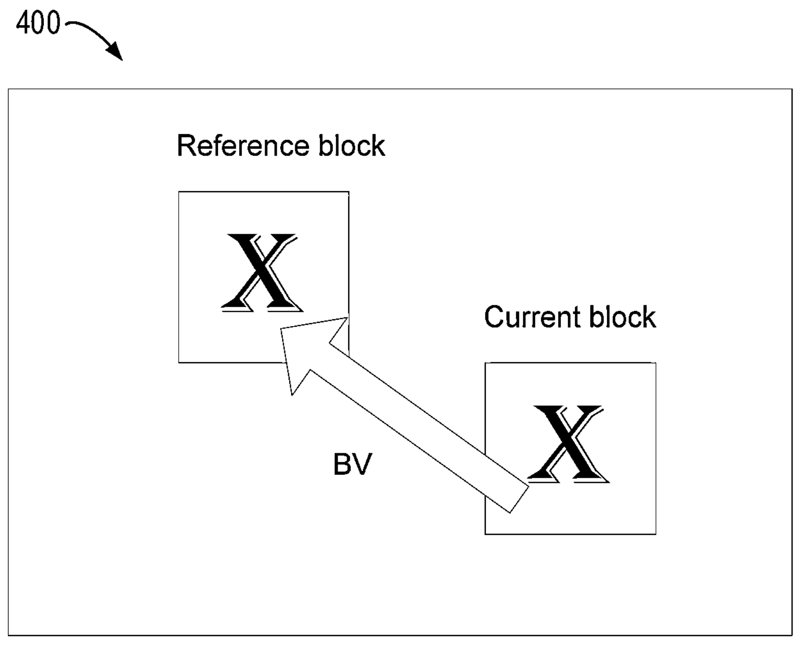
FIG. 4 illustrates a schematic diagram of intra block copy.

Intra block copy (IBC), a.k.a. current picture referencing, has been adopted in HEVC Screen Content Coding extensions (HEVC-SCC) and the current VVC test model (VTM-16.0). IBC extends the concept of motion compensation from inter-frame coding to intra-frame coding. FIG. 4 illustrates a schematic diagram of intra block copy. As demonstrated in FIG. 4, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.1.2 IBC in HEVC Screen Content Coding Extension

In the screen content coding extensions of HEVC, when a block uses current picture as reference, it should guarantee that the whole reference block is within the available reconstructed area, as indicated in the following spec text: The variables offsetX and offsetY are derived as follows:

$$offsetX = (ChromaArrayType == 0)\,?\,0 : (mvCLX[0]\ \&0\times7\,?\,2 : 0) \quad (2\text{-}1)$$

$$offsetY = (ChromaArrayType == 0)\,?\,0 : (mvCLX[1]\ \&0\times7\,?\,2 : 0) \quad (2\text{-}2)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both the following conditions shall be true:

The value of (mvLX[0]>>2)+nPbW+xB1+offsetX is less than or equal to 0.

The value of (mvLX[1]>>2)+nPbH+yB1+offsetY is less than or equal to 0.

The following condition shall be true:

$$(xPb+(mvLX[0]>>2)+nPbSw-1+offsetX)/CtbSizeY-xCurr/CtbSizeY<=yCurr/CtbSizeY-(yPb+(mvLX[1]>>2)+nPbSh-1+offsetY)/CtbSizeY \quad (2\text{-}3)$$

Thus, the case that the reference block overlaps with the current block or the reference block is outside of the picture will not happen. There is no need to pad the reference or prediction block.

2.1.3 IBC in VVC

As mentioned before, Intra block copy (IBC) is a tool adopted in HEVC extensions on SCC. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

- IBC skip/merge mode: a merge candidate index is used to indicate which of the block vectors in the list from neighboring candidate IBC coded blocks is used to predict the current block. The merge list consists of spatial, HMVP, and pairwise candidates.
- IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

Figure 5:
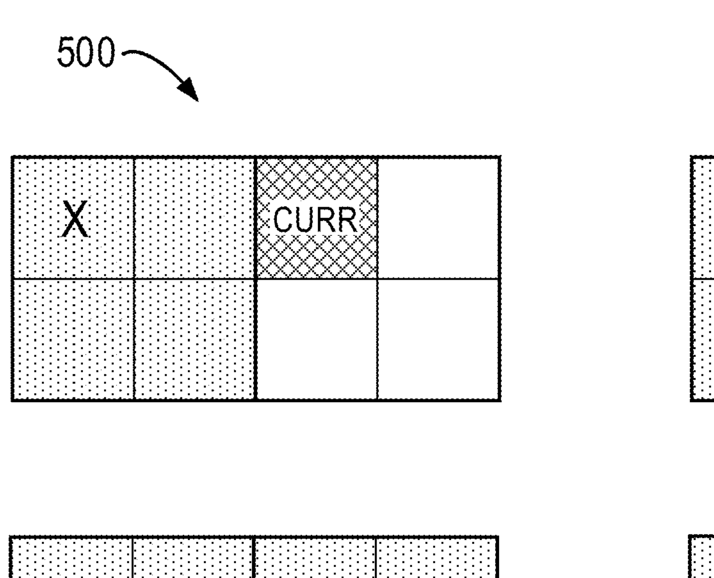
FIG. 5 illustrates current coding tree unit (CTU) processing order and its available reference samples in current and left CTU.
Figure 5:
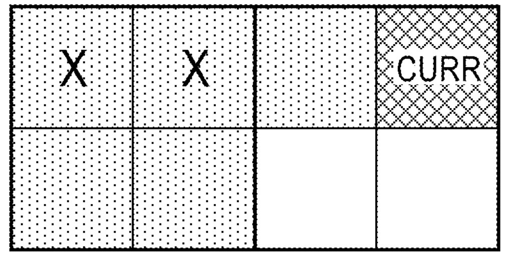
Figure 5:
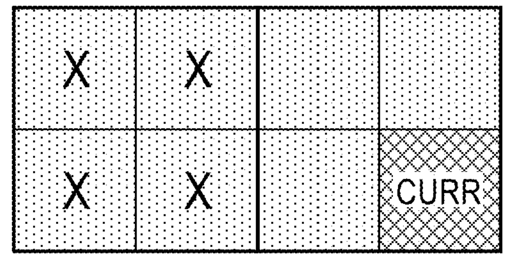

To reduce memory consumption and decoder complexity, the IBC in VVC allows only the reconstructed portion of the predefined area including the region of current CTU and some region of the left CTU. FIG. 5 illustrates the reference region of IBC Mode, where each block represents 64×64 luma sample unit.

As illustrated in FIG. 5, depending on the location of the current coding CU location within the current CTU, the following applies:

- If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.
- If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.
- If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.
- If current block falls into the bottom-right 64×64 block of the current CTU, it can only refer to the already reconstructed samples in the current CTU, using CPR mode.

This restriction allows the IBC mode to be implemented using local on-chip memory for hardware implementations.

2.2 Intra Coding

2.2.1 Intra Prediction

Figure 6:
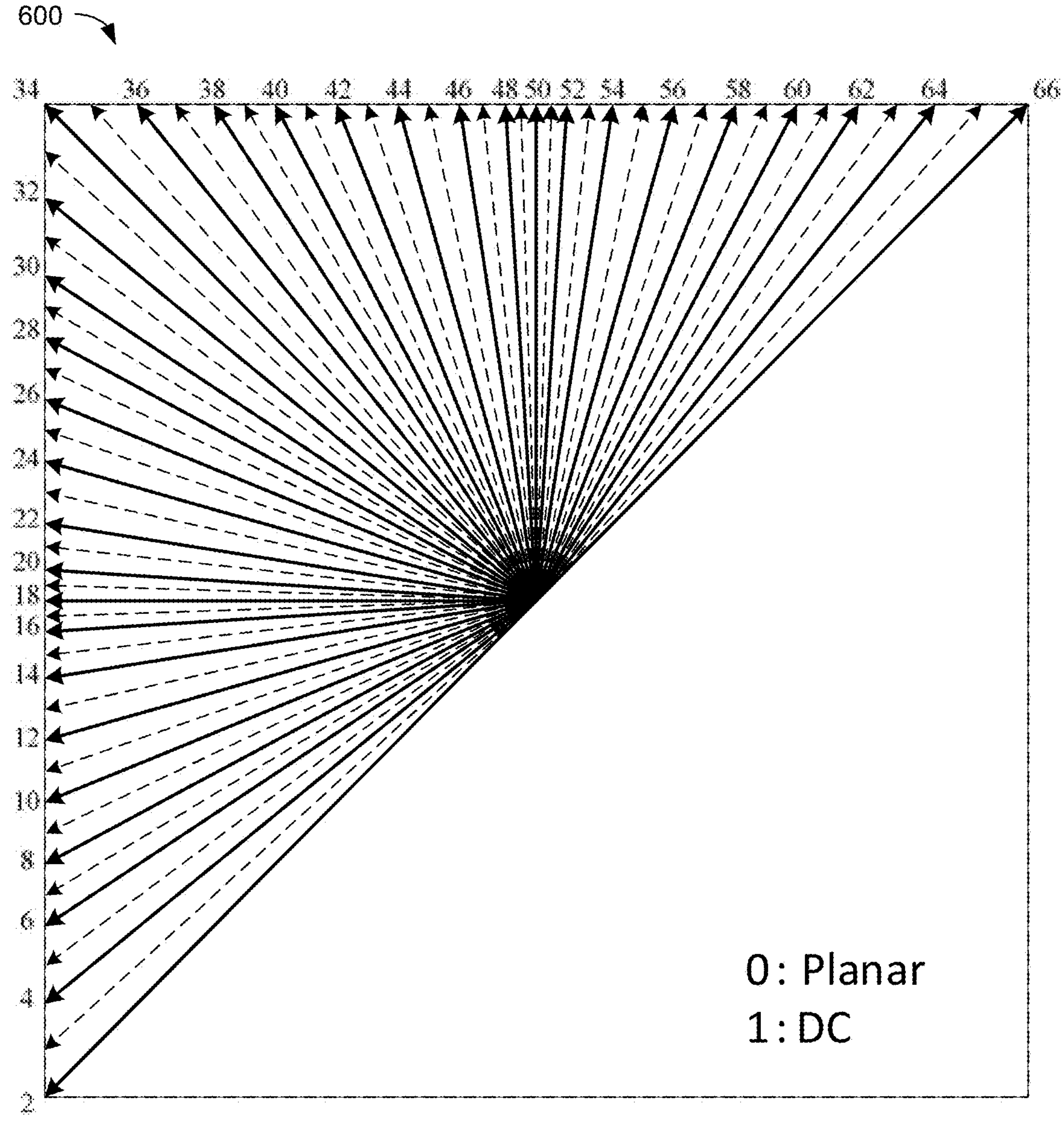
FIG. 6 illustrates a schematic diagram of the 67 intra prediction modes in VVC.

Intra prediction is designed to capture the textures of a block. A angular intra mode employs neighboring samples of a current block and predict the current block along a angular direction. To capture the arbitrary edge directions presented in natural video, the number of directional intra modes in VVC is extended from 33, as used in HEVC, to 65. The new directional modes not in HEVC are depicted as dashed arrows in FIG. 6, and the planar and DC modes remain the same. These denser directional intra prediction modes apply for all block sizes and for both luma and chroma intra predictions. FIG. 6 illustrates a schematic diagram of the 67 intra prediction modes in VVC.

2.2.2 Intra Prediction Mode Coding

To code the intra prediction mode efficiently, most probable modes (MPMs) is employed as predictions of the intra modes of a current block.

To keep the complexity of the MPM list generation low, an intra mode coding method with 6 MPMs is used by considering two available neighboring intra modes. The following three aspects are considered to construct the MPM list:

Default intra modes;

Neighbouring intra modes;

Derived intra modes.

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:

$$MPM\ \text{list} \rightarrow \{\text{Planar}, DC, V, H, V-4, V+4\}.$$

If one of modes Left and Above is angular mode, and the other is non-angular:

Set a mode Max as the larger mode in Left and Above;

$$MPM\ \text{list} \rightarrow \{\text{Planar}, \text{Max}, \text{Max}-1, \text{Max}+1, \text{Max}-2, \text{Max}+2\}.$$

If Left and Above are both angular and they are different:

Set a mode Max as the larger mode in Left and Above;

Set a mode Min as the smaller mode in Left and Above;

If Max–Min is equal to 1:

$$MPM\ \text{list} \rightarrow \{\text{Planar}, \text{Left}, \text{Above}, \text{Min}-1, \text{Max}+1, \text{Min}-2\}.$$

Otherwise, if Max–Min is greater than or equal to 62:

$$MPM\ \text{list} \rightarrow \{\text{Planar}, \text{Left}, \text{Above}, \text{Min}+1, \text{Max}-1, \text{Min}+2\}.$$

Otherwise, if Max–Min is equal to 2:

$$MPM\ \text{list} \rightarrow \{\text{Planar}, \text{Left}, \text{Above}, \text{Min}+1, \text{Min}-1, \text{Min}+1\}.$$

Otherwise:

$$MPM\ \text{list} \rightarrow \{\text{Planar}, \text{Left}, \text{Above}, \text{Min}-1, -\text{Min}+1, \text{Max}-1\}.$$

If Left and Above are both angular and they are the same:

$$MPM\ \text{list} \rightarrow \{\text{Planar}, \text{Left}, \text{Left}-1, \text{Left}+1, \text{Left}-2, \text{Left}+2\}.$$

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

2.3 Inter Prediction

Inter prediction is designed the exploit the temporal correlations of a video. The general idea of an inter prediction mode is to find a reference block for a current block. The motion information to indicate the position of the reference block is usually signalled. For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

In VVC, the merge candidate list is constructed by including the following five types of candidates in order:

1) Spatial MVP from spatial neighbour CUs;

2) Temporal MVP from collocated CUs;

3) History-based MVP from an FIFO table;

4) Pairwise average MVP;

5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

2.4 Quantization Parameter

Quantization parameters are signalled to indicate the strength of the dequantization to be performed. The quantization parameter related parts in VVC draft are described as below.

| | |
|---|---|
| if( treeType != DUAL_TREE_CHROMA && palette_escape_val_present_flag ) | |
|   if( pps_cu_qp_delta_enabled_flag && !IsCuQpDeltaCoded ) { | |
|     cu_qp_delta_abs | ae(v) |
|     if( cu_qp_delta_abs ) | |

-continued

```
      cu_qp_delta_sign_flag                                                    ae(v)
  }
  if( treeType != DUAL_TREE_LUMA && palette_escape_val_present_flag )
if( sh_cu_chroma_qp_offset_enabled_flag && !IsCuChromaQpOffsetCoded ) {
    cu_chroma_qp_offset_flag                                                   ae(v)
    if( cu_chroma_qp_offset_flag && pps_chroma_qp_offset_list_len_minus1 > 0 )
      cu_chroma_qp_offset_idx                                                  ae(v)
  }
```

Derivation Process for Quantization Parameters

Inputs to this process are:

a luma location (xCb, yCb) specifying the top-left luma sample of the current coding block relative to the top-left luma sample of the current picture, a variable cbWidth specifying the width of the current coding block in luma samples, a variable cbHeight specifying the height of the current coding block in luma samples, a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$, $Qp'_{Cr}$ and $Qp'_{CbCr}$ are derived.

The luma location (xQg, yQg), specifies the top-left luma sample of the current quantization group relative to the top-left luma sample of the current picture. The horizontal and vertical positions xQg and yQg are set equal to CuQgTopLeftX and CuQgTopLeftY, respectively.

NOTE—The current quantization group is a rectangular region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:

If one or more of the following conditions are true, $qP_{Y\_PREV}$ is set equal to $SliceQp_Y$:

The current quantization group is the first quantization group in a slice.

The current quantization group is the first quantization group in a tile.

Otherwise, $qP_{Y\_PREV}$ is set equal to the luma quantization parameter $Qp_Y$ of the last luma coding unit in the previous quantization group in decoding order.

2. The derivation process for neighbouring block availability as specified in subclause 6.4.4 is invoked with the location (xCurr, yCurr) set equal to (xCb, yCb), the neighbouring location (xNbY, yNbY) set equal to (xQg−1, yQg), checkPredModeY set equal to FALSE, and cIdx set equal to 0 as inputs, and the output is assigned to availableA. The variable $qP_{Y\_A}$ is derived as follows:

If one or more of the following conditions are true, $qP_{Y\_A}$ is set equal to $qP_{Y\_PREV}$:

availableA is equal to FALSE.

The CTB containing the luma coding block covering the luma location (xQg−1, yQg) is not equal to the CTB containing the current luma coding block at (xCb, yCb), i.e. one or more of the following conditions are true:

$$(xQg-1) \gg CtbLog2SizeY \text{ is not equal to } (xCb) \gg CtbLog2SizeY$$

$$(yQg) \gg CtbLog2SizeY \text{ is not equal to } (yCb) \gg CtbLog2SizeY$$

Otherwise, $qP_{Y\_A}$ is set equal to the luma quantization parameter $Qp_Y$ of the coding unit containing the luma coding block covering (xQg−1, yQg).

3. The derivation process for neighbouring block availability as specified in subclause 6.4.4 is invoked with the location (xCurr, yCurr) set equal to (xCb, yCb), the neighbouring location (xNbY, yNbY) set equal to (xQg, yQg−1), checkPredModeY set equal to FALSE, and cIdx set equal to 0 as inputs, and the output is assigned to availableB. The variable $qP_{Y\_B}$ is derived as follows:

If one or more of the following conditions are true, $qP_{Y\_B}$ is set equal to $qP_{Y\_PREV}$:

availableB is equal to FALSE.

The CTB containing the luma coding block covering the luma location (xQg, yQg−1) is not equal to the CTB containing the current luma coding block at (xCb, yCb), i.e. one or more of the following conditions are true:

$$(xQg) \gg CtbLog2SizeY \text{ is not equal to } (xCb) \gg CtbLog2SizeY$$

$$(yQg-1) \gg CtbLog2SizeY \text{ is not equal to } (yCb) \gg CtbLog2SizeY$$

Otherwise, $qP_{Y\_B}$ is set equal to the luma quantization parameter $Qp_Y$ of the coding unit containing the luma coding block covering (xQg, yQg−1).

4. The predicted luma quantization parameter $qP_{Y\_PRED}$ is derived as follows:

If all the following conditions are true, then $qP_{Y\_PRED}$ is set equal to the luma quantization parameter $Qp_Y$ of the coding unit containing the luma coding block covering (xQg, yQg−1):

availableB is equal to TRUE.

The current quantization group is the first quantization group in a CTB row within a tile.

Otherwise, $qP_{Y\_PRED}$ is derived as follows:

$$qP_{Y\_PRED} = (qP_{Y\_A} + qP_{Y\_B} + 1) >> 1 \qquad (1109)$$

The variable $Qp_Y$ is derived as follows:

$$Qp_Y = ((qP_{Y\_PRED} + CuQpDeltaVal + 64 + 2 * QpBdOffset)\ \%\ (64 + QpBdOffset)) - QpBdOffset \quad (1110)$$

The luma quantization parameter $Qp'_Y$ is derived as follows:

$$Qp'_Y = Qp_Y + QpBdOffset \quad (1111)$$

When sps_chroma_format_idc is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qP_{Chroma} = Clip3(-QpBdOffset, 63, Qp_Y) \quad (1112)$$

$$qP_{Cb} = ChromaQpTable[0][qP_{Chroma}] \quad (1113)$$

$$qP_{Cr} = ChromaQpTable[1][qP_{Chroma}] \quad (1114)$$

$$qP_{CbCr} = ChromaQpTable[2][qP_{Chroma}] \quad (1115)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = Clip3(-QpBdOffset, 63, qP_{Cb} + \text{pps\_cb\_qp\_offset} + \text{sh\_cb\_qp\_offset} + CuQpOffset_{Cb}) + QpBdOffset \quad (1116)$$

$$Qp'_{Cr} = Clip3(-QpBdOffset, 63, qP_{Cr} + \text{pps\_cr\_qp\_offset} + \text{sh\_cr\_qp\_offset} + CuQpOffset_{Cr}) + QpBdOffset \quad (1117)$$

$$Qp'_{CbCr} = Clip3(-QpBdOffset, 63, qP_{CbCr} + \text{pps\_joint\_cbcr\_qp\_offset\_value} + \text{sh\_joint\_cbcr\_qp\_offset} + CuQpOffset_{CbCr}) + QpBdOffset \quad (1118)$$

3 Problems

As shown in FIG. 5, the IBC virtual buffer is updated by only considering the position of current 64×64 block. For example, if a CTU size is 128×128 and a current block in the top-left 64×64 region is tested with IBC mode, the current block cannot use the samples in the top-left 64×64 region of its left CTU, which may lose some coding efficiency. In addition, although the virtual buffer size can be enlarged to include more samples, the hardware cost will be increased as well. Therefore, an adaptive update mechanism is needed for the IBC virtual buffer. Meanwhile, the IBC/inter merge candidates currently ordered by positions. However, the introduced distortion of each merge candidate may be estimated based on previous coded information then all IBC/inter merge candidates could be ordered by the estimated criterion.

4 Detailed Solutions

The detailed solutions below should be considered as examples to explain general concepts. These solutions should not be interpreted in a narrow way. Furthermore, these solutions can be combined in any manner.

On IBC Virtual Buffer Update:

1. K blocks to be included in the IBC virtual buffer may be from previously coded S blocks.
   a. In one example, the current block could be a CTU.
   b. In one example, the current block could be a N×M block (e.g. N=64 and M=64).
   c. In one example, the S blocks could be in different CTU lines.
   d. In one example, the K blocks could be in different CTU lines.
2. When determining which blocks to be included in the IBC virtual buffer, the coded information of CUs in these blocks may be considered.
   a. In one example, the coded information may include the prediction mode.
      i. Alternatively, in one example, the coded information may include intra prediction modes, MPM flags and/or MPM indices.
      ii. Alternatively, in one example, the coded information may include motion information (e.g., motion vectors/reference indices).
      iii. Alternatively, in one example, the coded information may include merge mode flags and/or merge mode indices.
      iv. Alternatively, in one example, the coded information may include quantization parameters.
      v. In one example, the coded information may include two or more information mentioned above.
3. Whether to include a block to the IBC virtual buffer may depend on the portions of its samples/CUs/PUs coded with a specific mode.
   a. In one example, the block may be a CTU or 64×64 block.
   b. In one example, among S blocks, K blocks may need to be included to the IBC virtual buffer.
      i. In one example, K blocks having largest portions of samples/CUs/PUs coded with merge modes may be selected.
      ii. In one example, K blocks having least portions of samples/CUs/PUs coded with merge modes may be selected.
      iii. In one example, K blocks having largest portions of samples/CUs/PUs coded with intra modes may be selected.
      iv. In one example, K blocks having least portions of samples/CUs/PUs coded with intra modes may be selected.
      v. In one example, K blocks having largest portions of samples/CUs/PUs coded with inter modes may be selected.
      vi. In one example, K blocks having least portions of samples/CUs/PUs coded with inter modes may be selected.
4. Whether to include a block to the IBC virtual buffer may depend on the quantization parameters (QPs) of CUs in the block.
   a. In one example, the block may be a CTU or 64×64 block.
   b. In one example, for S blocks, K blocks may need to be included to the IBC virtual buffer. Let $QP_{MIN}$(i) be the minimal value of QPs of CUs inside the $i^{th}$ block, $QP_{MAX}(i)$ be the maximal value of QPs of CUs inside the $i^{th}$ block, and $QP_{AVG}(i)$ be the average value of QPs of CUs inside the $i^{th}$ block, where i belongs to [1, S], inclusive.

i. In one example, K blocks with maximal $QP_{MIN}$ values among $\{QP_{MIN}(1), \ldots, QP_{MIN}(S)\}$ may be selected.

1) Alternatively, in one example, K blocks with maximal $QP_{MAX}$ values among $\{QP_{MAX}(1), \ldots, QP_{MAX}(S)\}$ may be selected.

2) Alternatively, in one example, K blocks with maximal $QP_{AVG}$ values among $\{QP_{AVG}(1), \ldots, QP_{AVG}(S)\}$ may be selected.

ii. In one example, K blocks with minimal $QP_{MIN}$ values among $\{QP_{MIN}(1), \ldots, QP_{MIN}(S)\}$ may be selected.

1) Alternatively, in one example, K blocks with minimal $QP_{MAX}$ values among $\{QP_{MAX}(1), \ldots, QP_{MAX}(S)\}$ may be selected.

2) Alternatively, in one example, K blocks with minimal $QP_{AVG}$ values among $\{QP_{AVG}(1), \ldots, QP_{AVG}(S)\}$ may be selected.

Figure 7:
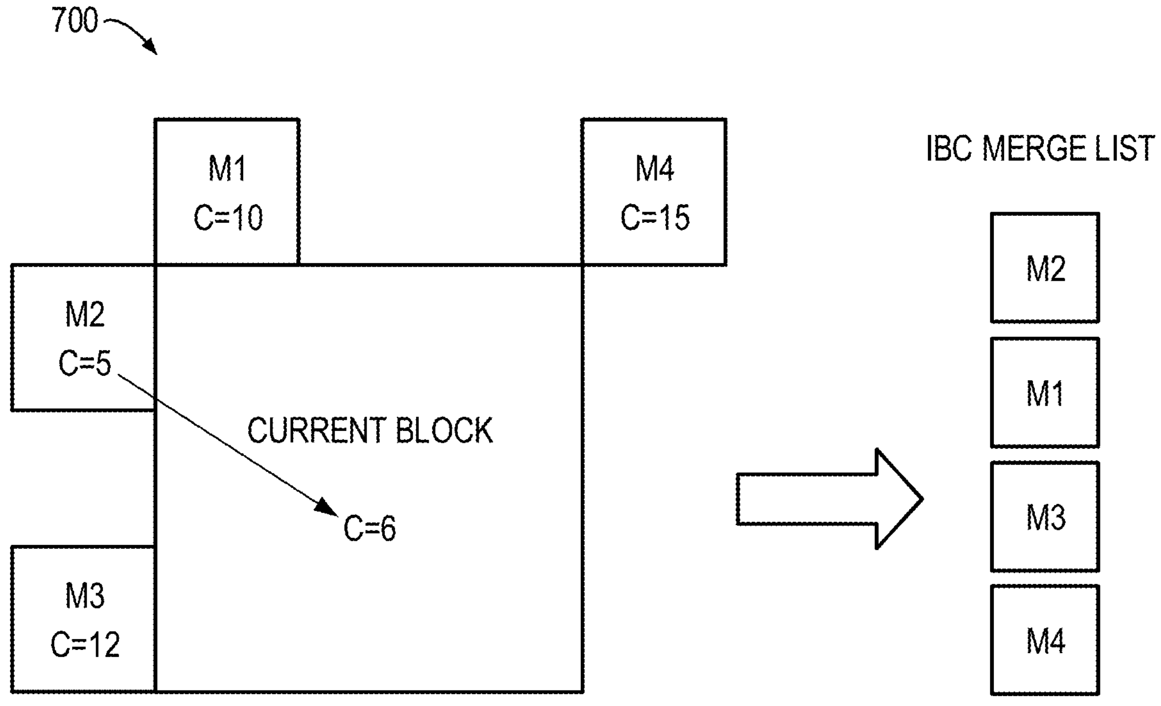
FIG. 7 illustrates a schematic diagram of sorting-based IBC merge list.

On IBC Merge Candidate's Reordering:

5. The position of a candidate in the IBC merge list may depend on the coded information of that candidate
   a. In one example, the coded information may include the prediction mode.
      i. Alternatively, in one example, the coded information may include intra prediction modes, MPM flags and/or MPM indices.
      ii. Alternatively, in one example, the coded information may include motion information (e.g., motion vectors/reference indices).
      iii. Alternatively, in one example, the coded information may include merge mode flags and/or merge mode indices.
      iv. Alternatively, in one example, the coded information may include quantization parameters.
      v. In one example, the coded information may include two or more information mentioned above.
6. The position of a candidates in the IBC merge list may depend on a statistical process.
   a. In one example, a counter may be used by statistical information.
      i. In one example, each unit in a slice/tile/frame/picture may have a counter.
         1) In one example, a unit may be a 4×4 block.
         2) In one example, a counter may be assigned to the unit to store the motion information.
      ii. In one example, the value of all counters in a slice/tile/frame/picture may be set to 0.
         1) In one example, the value of a counter may inherit from its IBC merge candidate and may be added by 1 if that merge candidate is selected.
         2) In one example, the value of a counter may inherit from that of its IBC merge candidate and may be added by 1 if that merge candidate is selected and the current block is coded with skip/merge mode.
         3) In one example, all counters of units in a block have a same value.
         4) In one example, the values of counters of all units in a block may be set to 0 if that block is not coded with skip/merge mode.
   b. In one example, the position of a candidate in the IBC merge list may depend on the value of its counter.
      i. In one example, candidates in the IBC merge list may be sorted based on their counters.
         1) In one example, for two IBC merge candidates A and B, if A has a smaller counter value compared to B, the A should be put ahead of B in the IBC merge list.
   c. In one example, as illustrated in FIG. 7, Mi denotes the i-th merge candidate and C denotes the counter value of a merge candidate. FIG. 7 illustrates a schematic diagram of sorting-based IBC merge list.
      i. In one example, M1, M2, M3 and M4 are sorted based on the counter values of all merge candidates in an ascending order.
      ii. In one example, M1, M2, M3 and M4 are sorted based on the counter values of all merge candidates in a descending order.
      iii. In one example, the counter of the current block may be set to equal to the counter value of M2 plus 1 if the block is coded with merge/skip mode and M2 is the selected candidate.

General Aspects:

7. K, S, M and/or N is an integer number and may be based on:
   a. Video contents (e.g. screen contents or natural contents);
   b. A message signaled in the DPS/SPS/VPS/PPS/APS/picture header/slice header/tile group header/Largest coding unit (LCU)/Coding unit (CU)/LCU row/group of LCUs/TU/PU;
   c. Block dimension of current block and/or its neighboring blocks;
   d. Block shape of current block and/or its neighboring blocks;
   e. Indication of the color format (such as 4:2:0, 4:4:4);
   f. Coding tree structure;
   g. Slice/tile group type and/or picture type;
   h. Color component (e.g. may be only applied on chroma components or luma component);
   i. Temporal layer ID;
   j. Profiles/Levels/Tiers of a standard.
8. Whether to and/or how to apply above methods may be based on:
   a. Video contents (e.g. screen contents or natural contents);
   b. A message signaled in the DPS/SPS/VPS/PPS/APS/picture header/slice header/tile group header/Largest coding unit (LCU)/Coding unit (CU)/LCU row/group of LCUs/TU/PU;
   c. Block dimension of current block and/or its neighboring blocks;
   d. Block shape of current block and/or its neighboring blocks;
   e. Indication of the color format (such as 4:2:0, 4:4:4);
   f. Coding tree structure;
   g. Slice/tile group type and/or picture type;
   h. Color component (e.g. may be only applied on chroma components or luma component);
   i. Temporal layer ID;
   j. Profiles/Levels/Tiers of a standard.
9. The above bullets may also be applied to inter merge coding and reference picture managements.

More details of the embodiments of the present disclosure will be described below which are related to IBC mode. The embodiments of the present disclosure should be considered as examples to explain the general concepts and should not be interpreted in a narrow way. Furthermore, these embodiments can be applied individually or combined in any manner.

As used herein, the term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular.

Figure 8:
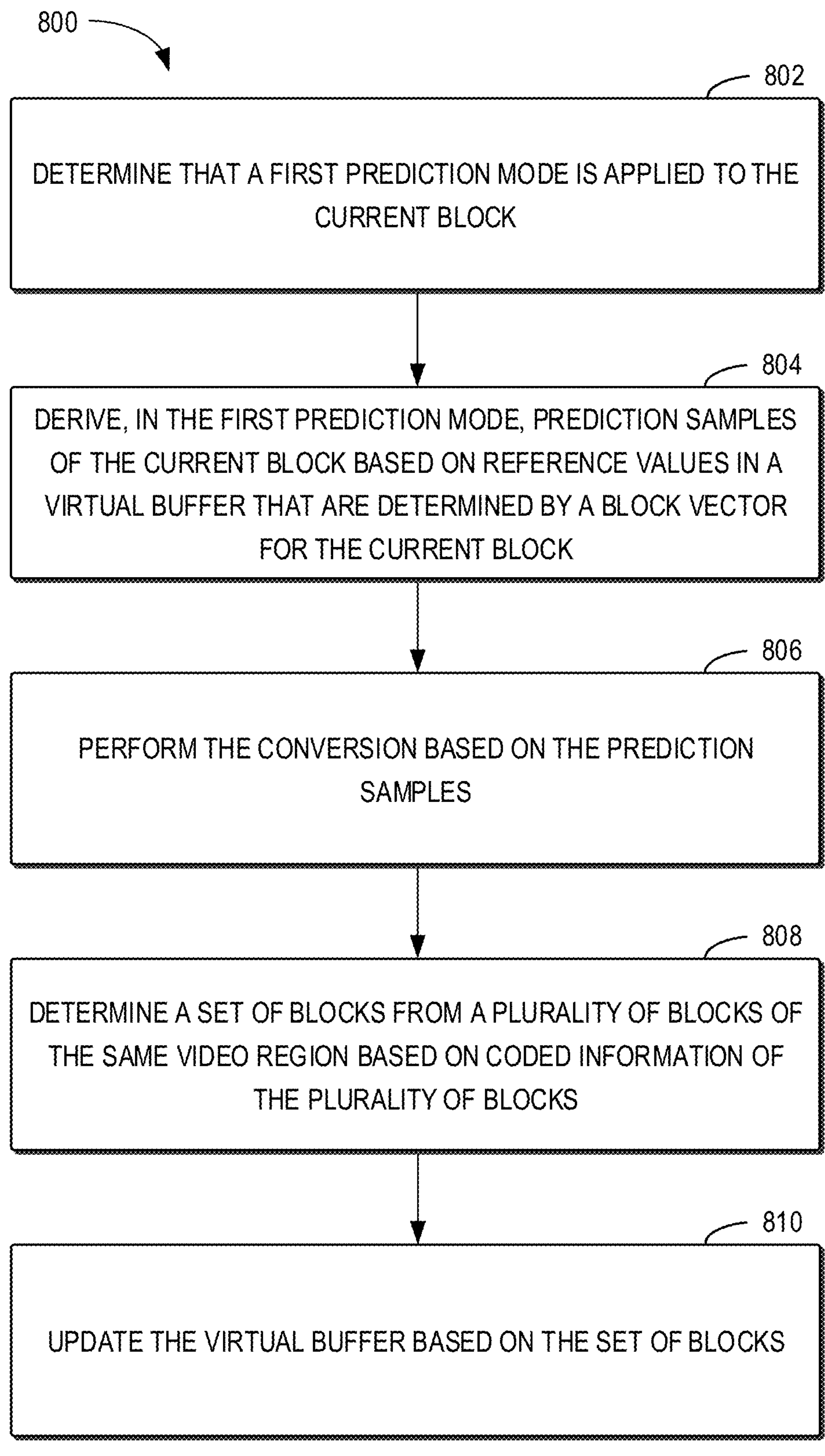
FIG. 8 illustrates a flowchart of a method for video processing in accordance with embodiments of the present disclosure.

FIG. 8 illustrates a flowchart of a method 800 for video processing in accordance with some embodiments of the present disclosure. The method 800 may be implemented during a conversion between a current block of a video and a bitstream of the video. As shown in FIG. 8, the method 800 starts at 802 where a first prediction mode is determined to be applied to the current block. At 804, in the first prediction mode, prediction samples of the current block are derived based on reference values in a virtual buffer that are determined by a block vector for the current block. Reference values in the virtual buffer are derived from blocks of sample values of a same video region of the current video block. For example, the video region may be a picture, a slice or the like. By way of example rather than limitation, the first prediction may be an IBC mode and the virtual buffer may be referred to as an "IBC virtual buffer".

At 806, the conversion is performed based on the prediction samples. In one example, the conversion may include encoding the current block into the bitstream. Alternatively or additionally, the conversion may include decoding the current block from the bitstream.

At 808, a set of blocks are determined from a plurality of blocks of the same video region based on coded information of the plurality of blocks. The plurality of blocks are coded before the current block. By way of example rather than limitation, the coded information may comprise a prediction mode, an intra prediction mode, a most probable mode (MPM) flag, an MPM index, motion information (such as a motion vector, or a reference index), a merge mode flag, a merge mode index, a quantization parameter (QP), and/or the like.

In some embodiments, the current block may be a coding tree unit (CTU) or any other suitable block. Moreover, a size of the current block may be N×M, and each of N and M may be an integer. By way of example, N may be 64 and M may be 64. Similarly, a block of the plurality of blocks may be a CTU or any other suitable block. In addition, a block of the plurality of blocks may have a predetermined size, such as 64×64. It should be understood that the above illustrations and/or examples are described merely for purpose of description. The scope of the present disclosure is not limited in this respect.

At 810, the virtual buffer is updated based on the set of blocks.

In view of the above, the virtual buffer for the first prediction mode is updated based on coded information. Compared with the conventional solution, the proposed method can advantageously update the virtual buffer adaptively. Thereby, the coding efficiency and coding quality can be improved.

In some embodiments, a first block of the plurality of blocks may be in a CTU line different from a second block of the plurality of blocks. That is, the plurality of blocks may be in different CTU lines. Additionally or alternatively, a third block of the set of blocks may be in a CTU line different from a fourth block of the set of blocks. That is, the set of blocks may be in different CTU lines.

In some embodiments, at 802, a value of a proportion of target units in the respective block that may be coded with a target mode may be determined for each of the plurality of blocks. Moreover, the set of blocks may be selected from the plurality of blocks based on values of the proportion for the plurality of blocks. By way of example rather than limitation, the target unit may comprise a sample, a coding unit (CU), a prediction unit (PU), or the like. The target mode may comprise a merge mode, an intra mode, an inter mode, or the like.

In some embodiments, the set of blocks may comprise K blocks with top K largest values of the proportion. Alternatively, the set of blocks may comprise K blocks with top K least values of the proportion. K may be an integer.

In some embodiments, at 802, for each of the plurality of blocks, a value of a first parameter may be determined based on the minimal value of QPs of CUs in the respective block. Moreover, the set of blocks may be selected from the plurality of blocks based on values of the first parameter for the plurality of blocks. In one example, the set of blocks may comprise K blocks with top K largest values of the first parameter. Alternatively, the set of blocks may comprise K blocks with top K least values of the first parameter. K may be an integer.

In some embodiments, at 802, for each of the plurality of blocks, a value of a second parameter may be determined based on the maximal value of QPs of CUs in the respective block. In addition, the set of blocks may be selected from the plurality of blocks based on values of the second parameter for the plurality of blocks. In one example, the set of blocks may comprise K blocks with top K largest values of the second parameter. Alternatively, the set of blocks may comprise K blocks with top K least values of the second parameter. K may be an integer.

In some embodiments, at 802, for each of the plurality of blocks, a value of a third parameter may be determined based on an average value of QPs of CUs in the respective block. Furthermore, the set of blocks may be selected from the plurality of blocks based on values of the third parameter for the plurality of blocks. In one example, the set of blocks may comprise K blocks with top K largest values of the third parameter. Alternatively, the set of blocks may comprise K blocks with top K least values of the third parameter. K may be an integer.

In some embodiments, a size of the current block may be N×M. The number of blocks in the set of blocks may be K. The number of blocks in the plurality of blocks may be S. At least one of M, N, K, or S may be an integer and dependent on at least one of the following: video contents of the video, a message comprised in a dependency parameter set (DPS), a message comprised in a sequence parameter set (SPS), a message comprised in a video parameter set (VPS), a message comprised in a picture parameter set (PPS), a message comprised in an adaptation parameter sets (APS), a message comprised in a picture header, a message comprised in a slice header, a message comprised in a tile group header, a message comprised in a largest coding unit (LCU), a message comprised in a CU, a message comprised in an LCU row, a message comprised in a group of LCUs, a message comprised in a transform unit (TU), a message comprised in a PU, a dimension of the current block, a dimension of a neighboring block of the current block, a shape of the current block, a shape of a neighboring block of the current block, an indication of a color format of the video, a coding tree structure associated with the current block, a slice type associated with the current block, a tile group type associated with the current block, a picture type associated with the current block, a color component of the current block, a temporal layer identity (ID) of the current block, a profile of a standard, a level of the standard, or a tier of the standard.

In some embodiments, whether to and/or how to apply the method may be dependent on at least one of the following: video contents of the video, a message comprised in a DPS, a message comprised in an SPS, a message comprised in a VPS, a message comprised in a PPS, a message comprised in an APS, a message comprised in a picture header, a message comprised in a slice header, a message comprised in a tile group header, a message comprised in an LCU, a message comprised in a CU, a message comprised in an LCU row, a message comprised in a group of LCUs, a message comprised in a TU, a message comprised in a PU, a dimension of the current block, a dimension of a neighboring block of the current block, a shape of the current block, a shape of a neighboring block of the current block, an indication of a color format of the video, a coding tree structure associated with the current block, a slice type associated with the current block, a tile group type associated with the current block, a picture type associated with the current block, a color component of the current block, a temporal layer ID of the current block, a profile of a standard, a level of the standard, or a tier of the standard.

It should be understood that the above-described method may also be applied to inter merge coding or reference picture management. The scope of the present disclosure is not limited in this respect.

According to further embodiments of the present disclosure, a non-transitory computer-readable recording medium is provided. The non-transitory computer-readable recording medium stores a bitstream of a video which is generated by a method performed by an apparatus for video processing. The method comprises: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; and updating the virtual buffer based on the set of blocks.

According to still further embodiments of the present disclosure, a method for storing bitstream of a video is provided. The method comprises: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; updating the virtual buffer based on the set of blocks; and storing the bitstream in a non-transitory computer-readable recording medium.

Figure 9:
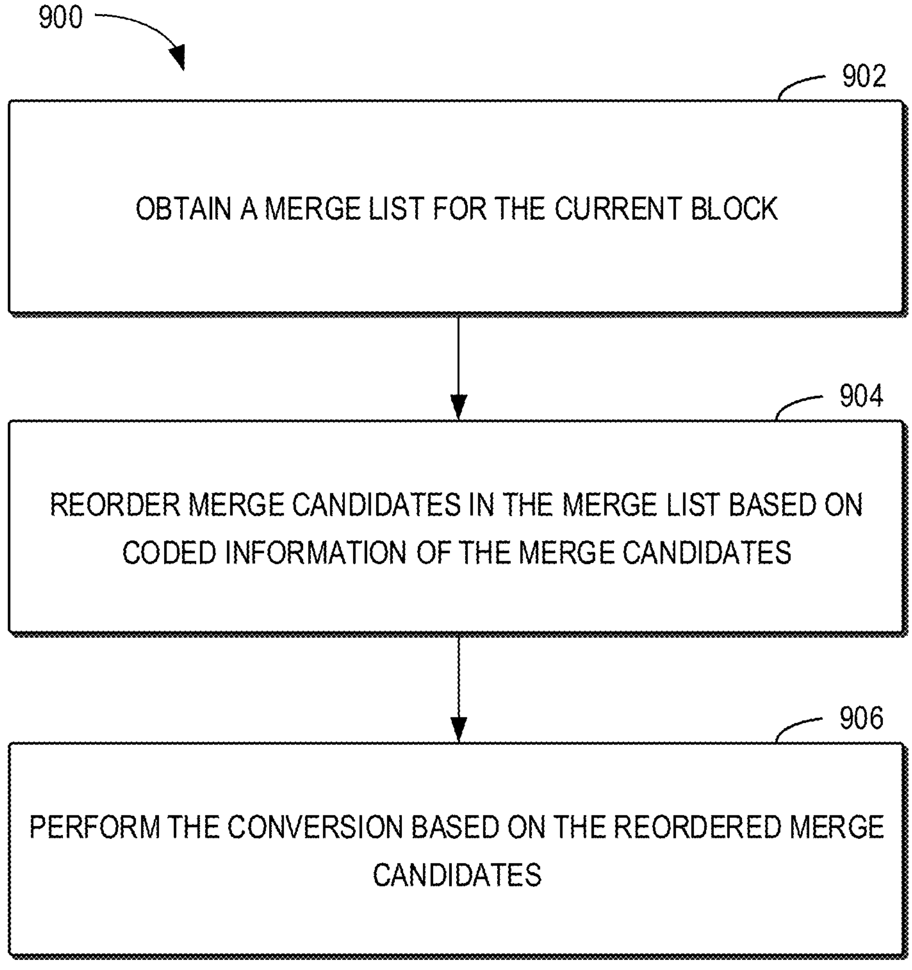
FIG. 9 illustrates a flowchart of a method for video processing in accordance with embodiments of the present disclosure.

FIG. 9 illustrates a flowchart of a method 900 for video processing in accordance with some embodiments of the present disclosure. The method 900 may be implemented during a conversion between a current block of a video and a bitstream of the video. As shown in FIG. 9, the method 900 starts at 902 where a merge list for the current block is obtained. By way of example rather than limitation, the merge list may be an IBC merge list, an inter merge list or the like. In some embodiments, the merge list may be generated according to a predetermined rule. Alternatively, the merge list may be received from any other suitable source. The scope of the present disclosure is not limited in this respect.

At 904, merge candidates in the merge list are reordered based on coded information of the merge candidates. By way of example rather than limitation, the coded information may comprise a prediction mode, an intra prediction mode, a most probable mode (MPM) flag, an MPM index, motion information (such as a motion vector or a reference index), a merge mode flag, a merge mode index, or a quantization parameter (QP), and/or the like.

At 906, the conversion is performed based on the reordered merge candidates. In one example, the conversion may include encoding the current block into the bitstream. Alternatively or additionally, the conversion may include decoding the current block from the bitstream.

In view of the above, merge candidates in the merge list are reordered based on coded information. Compared with the conventional solution, the proposed method can advantageously reorder the merge candidates in the merge list, so as to improve the coding efficiency and coding quality.

In some embodiments, the merge candidates may be reordered based on a statistical process and the coded information. For example, a counter for the statistical process may be assigned to each of a plurality of units in a slice of the video, a tile of the video, a frame of the video, a picture of the video, or the like. In some embodiments, each of the plurality of units may comprise a block with a predetermined size, such as 4×4. Additionally, the plurality of units may be used to store motion information. In other words, the motion information may be stored based on the plurality of units.

In some embodiments, a value of the counter may be set to a first predetermined value for initialization. In one example, if a first merge candidate is selected for a first unit of the plurality of units, a value of the counter for the first unit may be determined based on a sum of a second predetermined value (e.g., 1) and a value of the counter for a unit corresponding to the first merge candidate. Alternatively, if a first merge candidate is selected for a first unit of the plurality of units and the first unit is coded with a skip mode or a merge mode, a value of the counter for the first unit may be determined based on a sum of a second predetermined value (e.g., 1) and a value of the counter for a unit corresponding to the first merge candidate. Thereby, the counter may be used to estimate the introduced distortion of each merge candidate based on previous coded information, and then all of merge candidates could be ordered according to the estimated distortion. Thereby, the merge candidates in the merge list may be ordered in a more reasonable manner.

In some embodiments, values of counters of all units in a block of video may be the same. Additionally, if a block of the video is coded without a skip mode and a merge mode, values of counters of all units in the block may be set to a third predetermined value (e.g., 0). It should be understood that the above examples are described merely for purpose of description. The scope of the present disclosure is not limited in this respect.

In some embodiments, a position of a merge candidate in the merge list may be dependent on a value of a counter of a unit corresponding to the merge candidate. For example, the merge candidates in the merge list may be reordered based on values of counters for units corresponding to the merge candidates. By way of example rather than limitation, the merge candidates in the merge list comprise a second merge candidate and a third merge candidate. If a value of a counter for a unit corresponding to the second merge candidate is smaller than the third merge candidate, the second merge candidate precedes the third merge candidate in the merge list.

In some embodiments, the merge candidates in the merge list may be reordered based on the values of the counters in an ascending order. Alternatively, the merge candidates in the merge list may be reordered based on the values of the counters in a descending order.

In some embodiments, whether to and/or how to apply the method may be dependent on at least one of the following: video contents of the video, a message comprised in a DPS, a message comprised in an SPS, a message comprised in a VPS, a message comprised in a PPS, a message comprised in an APS, a message comprised in a picture header, a message comprised in a slice header, a message comprised in a tile group header, a message comprised in an LCU, a message comprised in a CU, a message comprised in an LCU row, a message comprised in a group of LCUs, a message comprised in a TU, a message comprised in a PU, a dimension of the current block, a dimension of a neighboring block of the current block, a shape of the current block, a shape of a neighboring block of the current block, an indication of a color format of the video, a coding tree structure associated with the current block, a slice type associated with the current block, a tile group type associated with the current block, a picture type associated with the current block, a color component of the current block, a temporal layer ID of the current block, a profile of a standard, a level of the standard, or a tier of the standard.

It should be understood that the method may also be applied to inter merge coding or reference picture management. The scope of the present disclosure is not limited in this respect.

According to further embodiments of the present disclosure, a non-transitory computer-readable recording medium is provided. The non-transitory computer-readable recording medium stores a bitstream of a video which is generated by a method performed by an apparatus for video processing. In the method, a merge list for a current block of the video is obtained. Merge candidates in the merge list are reordered based on coded information of the merge candidates. Moreover, the bitstream is generated based on the reordered merge candidates.

According to still further embodiments of the present disclosure, a method for storing bitstream of a video is provided. In the method, a merge list for a current block of the video is obtained. Merge candidates in the merge list are reordered based on coded information of the merge candidates. Moreover, the bitstream is generated based on the reordered merge candidates and the bitstream is stored in a non-transitory computer-readable recording medium.

Implementations of the present disclosure can be described in view of the following clauses, the features of which can be combined in any reasonable manner.

Clause 1. A method for video processing, comprising: determining, for a conversion between a current block of a video and a bitstream of the video, that a first prediction mode is applied to the current block, deriving, in the first prediction mode, prediction samples of the current block based on reference values in a virtual buffer that are determined by a block vector for the current block; wherein reference values in the virtual buffer are derived from blocks of sample values of a same video region of the current video block; performing the conversion based on the prediction samples; determining a set of blocks from a plurality of blocks of the same video region based on coded information of the plurality of blocks, the plurality of blocks being coded before the current block; and updating the virtual buffer based on the set of blocks.

Clause 2. The method of clause 1, wherein the coded information comprises at least one of the following: a prediction mode, an intra prediction mode, a most probable mode (MPM) flag, an MPM index, motion information, a merge mode flag, a merge mode index, or a quantization parameter (QP).

Clause 3. The method of clause 2, wherein the motion information comprises at least one of the following: a motion vector, or a reference index.

Clause 4. The method of any of clauses 1-3, wherein the current block is a coding tree unit (CTU).

Clause 5. The method of any of clauses 1-4, wherein a size of the current block is N×M, and each of N and M is an integer.

Clause 6. The method of clause 5, wherein N is 64 and M is 64.

Clause 7. The method of any of clauses 1-6, wherein a first block of the plurality of blocks is in a CTU line different from a second block of the plurality of blocks.

Clause 8. The method of any of clauses 1-7, wherein a third block of the set of blocks is in a CTU line different from a fourth block of the set of blocks.

Clause 9. The method of any of clauses 1-8, wherein a block of the plurality of blocks is a CTU.

Clause 10. The method of any of clauses 1-9, wherein a block of the plurality of blocks has a predetermined size.

Clause 11. The method of clause 10, wherein the predetermined size is 64×64.

Clause 12. The method of any of clauses 1-11, wherein determining the set of blocks comprises: determining, for each of the plurality of blocks, a value of a proportion of target units in the respective block that are coded with a target mode; and selecting the set of blocks from the plurality of blocks based on values of the proportion for the plurality of blocks.

Clause 13. The method of clause 12, wherein the target unit comprises one of the following: a sample, a coding unit (CU), or a prediction unit (PU).

Clause 14. The method of any of clauses 12-13, wherein the set of blocks comprises K blocks with top K largest values of the proportion, and K is an integer.

Clause 15. The method of any of clauses 12-13, wherein the set of blocks comprises K blocks with top K least values of the proportion, and K is an integer.

Clause 16. The method of any of clauses 12-15, wherein the target mode comprises one of the following: a merge mode, an intra mode, or an inter mode.

Clause 17. The method of any of clauses 1-11, wherein determining the set of blocks comprises: determining, for each of the plurality of blocks, a value of a first parameter based on the minimal value of QPs of CUs in the respective block; and selecting the set of blocks from the plurality of blocks based on values of the first parameter for the plurality of blocks.

Clause 18. The method of clause 17, wherein the set of blocks comprises K blocks with top K largest values of the first parameter, and K is an integer.

Clause 19. The method of clause 17, wherein the set of blocks comprises K blocks with top K least values of the first parameter, and K is an integer.

Clause 20. The method of any of clauses 1-11, wherein determining the set of blocks comprises: determining, for each of the plurality of blocks, a value of a second parameter based on the maximal value of QPs of CUs in the respective block; and selecting the set of blocks from the plurality of blocks based on values of the second parameter for the plurality of blocks.

Clause 21. The method of clause 20, wherein the set of blocks comprises K blocks with top K largest values of the second parameter, and K is an integer.

Clause 22. The method of clause 20, wherein the set of blocks comprises K blocks with top K least values of the second parameter, and K is an integer.

Clause 23. The method of any of clauses 1-11, wherein determining the set of blocks comprises: determining, for each of the plurality of blocks, a value of a third parameter based on an average value of QPs of CUs in the respective block; and selecting the set of blocks from the plurality of blocks based on values of the third parameter for the plurality of blocks.

Clause 24. The method of clause 23, wherein the set of blocks comprises K blocks with top K largest values of the third parameter, and K is an integer.

Clause 25. The method of clause 23, wherein the set of blocks comprises K blocks with top K least values of the third parameter, and K is an integer.

Clause 26. The method of any of clauses 1-25, wherein a size of the current block is N×M, the number of blocks in the set of blocks is K, the number of blocks in the plurality of blocks is S, and at least one of M, N, K, or S is an integer and dependent on at least one of the following: video contents of the video, a message comprised in a dependency parameter set (DPS), a message comprised in a sequence parameter set (SPS), a message comprised in a video parameter set (VPS), a message comprised in a picture parameter set (PPS), a message comprised in an adaptation parameter sets (APS), a message comprised in a picture header, a message comprised in a slice header, a message comprised in a tile group header, a message comprised in a largest coding unit (LCU), a message comprised in a CU, a message comprised in an LCU row, a message comprised in a group of LCUs, a message comprised in a transform unit (TU), a message comprised in a PU, a dimension of the current block, a dimension of a neighboring block of the current block, a shape of the current block, a shape of a neighboring block of the current block, an indication of a color format of the video, a coding tree structure associated with the current block, a slice type associated with the current block, a tile group type associated with the current block, a picture type associated with the current block, a color component of the current block, a temporal layer identity (ID) of the current block, a profile of a standard, a level of the standard, or a tier of the standard.

Clause 27. A method for video processing, comprising: obtaining, for a conversion between a current block of a video and a bitstream of the video, a merge list for the current block; reordering merge candidates in the merge list based on coded information of the merge candidates; and performing the conversion based on the reordered merge candidates.

Clause 28. The method of clause 27, wherein the merge list is an IBC merge list.

Clause 29. The method of clause 27, wherein the merge list is an inter merge list.

Clause 30. The method of any of clauses 27-29, wherein the coded information comprises at least one of the following: a prediction mode, an intra prediction mode, a most probable mode (MPM) flag, an MPM index, motion information, a merge mode flag, a merge mode index, or a quantization parameter (QP).

Clause 31. The method of clause 30, wherein the motion information comprises at least one of the following: a motion vector, or a reference index.

Clause 32. The method of any of clauses 27-31, wherein the merge candidates are reordered based on a statistical process and the coded information.

Clause 33. The method of clause 32, wherein a counter for the statistical process is assigned to each of a plurality of units in one of the following: a slice of the video, a tile of the video, a frame of the video, or a picture of the video.

Clause 34. The method of clause 33, wherein each of the plurality of units comprises a block with a predetermined size.

Clause 35. The method of any of clauses 33-34, wherein the plurality of units are used to store motion information.

Clause 36. The method of any of clauses 33-35, wherein a value of the counter is set to a first predetermined value for initialization.

Clause 37. The method of any of clauses 33-36, wherein if a first merge candidate is selected for a first unit of the plurality of units, a value of the counter for the first unit is determined based on a sum of a second predetermined value and a value of the counter for a unit corresponding to the first merge candidate.

Clause 38. The method of any of clauses 33-36, wherein if a first merge candidate is selected for a first unit of the plurality of units and the first unit is coded with a skip mode or a merge mode, a value of the counter for the first unit is determined based on a sum of a second predetermined value and a value of the counter for a unit corresponding to the first merge candidate.

Clause 39. The method of any of clauses 33-38, wherein values of counters of all units in a block of video are the same.

Clause 40. The method of any of clauses 33-39, wherein if a block of the video is coded without a skip mode and a merge mode, values of counters of all units in the block are set to a third predetermined value.

Clause 41. The method of any of clauses 33-40, wherein a position of a merge candidate in the merge list is dependent on a value of a counter of a unit corresponding to the merge candidate.

Clause 42. The method of clause 41, wherein the merge candidates in the merge list are reordered based on values of counters for units corresponding to the merge candidates.

Clause 43. The method of any of clauses 41-42, wherein the merge candidates in the merge list comprise a second merge candidate and a third merge candidate, if a value of a counter for a unit corresponding to the second merge candidate is smaller than the third merge candidate, the second merge candidate precedes the third merge candidate in the merge list.

Clause 44. The method of clause 42, wherein the merge candidates in the merge list are reordered based on the values of the counters in an ascending order.

Clause 45. The method of clause 42, wherein the merge candidates in the merge list are reordered based on the values of the counters in a descending order.

Clause 46. The method of any of clauses 1-45, wherein the method is applied to inter merge coding or reference picture management.

Clause 47. The method of any of clauses 1-46, wherein whether to and/or how to apply the method is dependent on at least one of the following: video contents of the video, a message comprised in a DPS, a message comprised in an SPS, a message comprised in a VPS, a message comprised in a PPS, a message comprised in an APS, a message comprised in a picture header, a message comprised in a slice header, a message comprised in a tile group header, a message comprised in an LCU, a message comprised in a CU, a message comprised in an LCU row, a message comprised in a group of LCUs, a message comprised in a TU, a message comprised in a PU, a dimension of the current block, a dimension of a neighboring block of the current block, a shape of the current block, a shape of a neighboring block of the current block, an indication of a color format of the video, a coding tree structure associated with the current block, a slice type associated with the current block, a tile group type associated with the current block, a picture type associated with the current block, a color component of the current block, a temporal layer ID of the current block, a profile of a standard, a level of the standard, or a tier of the standard.

Clause 48. The method of any of clauses 1-47, wherein the conversion includes encoding the current block into the bitstream.

Clause 49. The method of any of clauses 1-47, wherein the conversion includes decoding the current block from the bitstream.

Clause 50. An apparatus for video processing comprising a processor and a non-transitory memory with instructions thereon, wherein the instructions upon execution by the processor, cause the processor to perform a method in accordance with any of clauses 1-26.

Clause 51. A non-transitory computer-readable storage medium storing instructions that cause a processor to perform a method in accordance with any of clauses 1-26.

Clause 52. A non-transitory computer-readable recording medium storing a bitstream of a video which is generated by a method performed by an apparatus for video processing, wherein the method comprises: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; and updating the virtual buffer based on the set of blocks.

Clause 53. A method for storing a bitstream of a video, comprising: determining that a first prediction mode is applied to a current block of the video, deriving, in the first prediction mode, prediction samples of the current block based on reference values in a virtual buffer that are determined by a block vector for the current block; wherein reference values in the virtual buffer are derived from blocks of sample values of a same video region of the current video block; generating the bitstream based on the prediction samples; determining a set of blocks from a plurality of blocks of the same video region based on coded information of the plurality of blocks, the plurality of blocks being coded before the current block; updating the virtual buffer based on the set of blocks; and storing the bitstream in a non-transitory computer-readable recording medium.

Clause 54. A non-transitory computer-readable recording medium storing a bitstream of a video which is generated by a method performed by an apparatus for video processing, wherein the method comprises: obtaining a merge list for a current block of the video; reordering merge candidates in the merge list based on coded information of the merge candidates; and generating the bitstream based on the reordered merge candidates.

Clause 55. A method for storing a bitstream of a video, comprising: obtaining a merge list for a current block of the video; reordering merge candidates in the merge list based on coded information of the merge candidates; generating the bitstream based on the reordered merge candidates; and storing the bitstream in a non-transitory computer-readable recording medium.

Example Device

Figure 10:
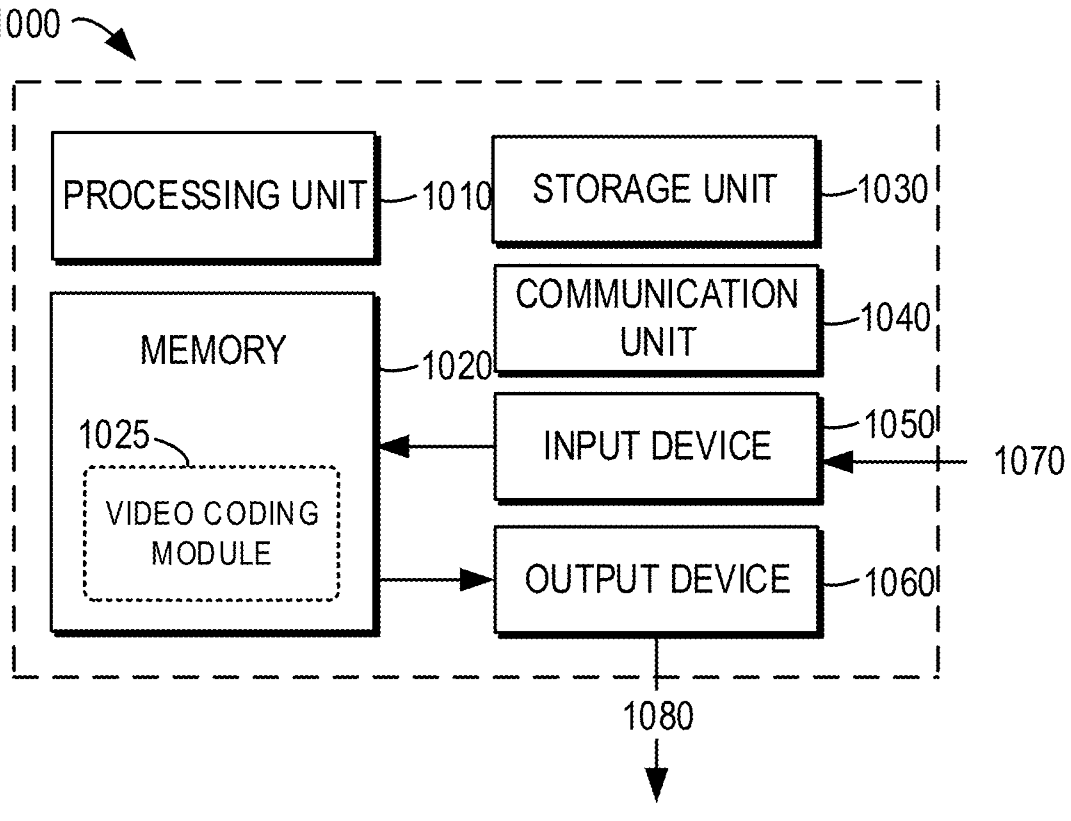
FIG. 10 illustrates a block diagram of a computing device in which various embodiments of the present disclosure can be implemented.

FIG. 10 illustrates a block diagram of a computing device 1000 in which various embodiments of the present disclosure can be implemented. The computing device 1000 may be implemented as or included in the source device 110 (or the video encoder 114 or 200) or the destination device 120 (or the video decoder 124 or 300).

It would be appreciated that the computing device 1000 shown in FIG. 10 is merely for purpose of illustration, without suggesting any limitation to the functions and scopes of the embodiments of the present disclosure in any manner.

As shown in FIG. 10, the computing device 1000 includes a general-purpose computing device 1000. The computing device 1000 may at least comprise one or more processors or processing units 1010, a memory 1020, a storage unit 1030, one or more communication units 1040, one or more input devices 1050, and one or more output devices 1060.

In some embodiments, the computing device 1000 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1000 can support any type of interface to a user (such as "wearable" circuitry and the like).

The processing unit 1010 may be a physical or virtual processor and can implement various processes based on programs stored in the memory 1020. In a multi-processor system, multiple processing units execute computer executable instructions in parallel so as to improve the parallel processing capability of the computing device 1000. The processing unit 1010 may also be referred to as a central processing unit (CPU), a microprocessor, a controller or a microcontroller.

The computing device 1000 typically includes various computer storage medium. Such medium can be any medium accessible by the computing device 1000, including, but not limited to, volatile and non-volatile medium, or detachable and non-detachable medium. The memory 1020 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1030 may be any detachable or non-detachable medium and may include a machine-readable medium such as a memory, flash memory drive, magnetic disk or another other media, which can be used for storing information and/or data and can be accessed in the computing device 1000.

The computing device 1000 may further include additional detachable/non-detachable, volatile/non-volatile memory medium. Although not shown in FIG. 10, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1040 communicates with a further computing device via the communication medium. In addition, the functions of the components in the computing device 1000 can be implemented by a single computing cluster or multiple computing machines that can communicate via communication connections. Therefore, the computing device 1000 can operate in a networked environment using a logical connection with one or more other servers, networked personal computers (PCs) or further general network nodes.

The input device 1050 may be one or more of a variety of input devices, such as a mouse, keyboard, tracking ball, voice-input device, and the like. The output device 1060 may be one or more of a variety of output devices, such as a display, loudspeaker, printer, and the like. By means of the communication unit 1040, the computing device 1000 can further communicate with one or more external devices (not shown) such as the storage devices and display device, with one or more devices enabling the user to interact with the computing device 1000, or any devices (such as a network card, a modem and the like) enabling the computing device 1000 to communicate with one or more other computing devices, if required. Such communication can be performed via input/output (I/O) interfaces (not shown).

In some embodiments, instead of being integrated in a single device, some or all components of the computing device 1000 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1000 may be used to implement video encoding/decoding in embodiments of the present disclosure. The memory 1020 may include one or more video coding modules 1025 having one or more program instructions. These modules are accessible and executable by the processing unit 1010 to perform the functionalities of the various embodiments described herein.

In the example embodiments of performing video encoding, the input device 1050 may receive video data as an input 1070 to be encoded. The video data may be processed, for example, by the video coding module 1025, to generate an encoded bitstream. The encoded bitstream may be provided via the output device 1060 as an output 1080.

In the example embodiments of performing video decoding, the input device 1050 may receive an encoded bitstream as the input 1070. The encoded bitstream may be processed, for example, by the video coding module 1025, to generate decoded video data. The decoded video data may be provided via the output device 1060 as the output 1080.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, for a conversion between a current block of a video and a bitstream of the video, that a first prediction mode is applied to the current block;

deriving, in the first prediction mode, prediction samples of the current block based on reference values in a virtual buffer that are determined by a block vector for the current block, wherein the reference values in the virtual buffer are derived from blocks of sample values of a same video region of the current block;

performing the conversion based on the prediction samples;

determining a set of blocks from a plurality of blocks of the same video region based on coded information of the plurality of blocks, the plurality of blocks being coded before the current block; and updating the virtual buffer based on the set of blocks.

2. The method of claim 1, wherein the coded information comprises at least one of:

a prediction mode, an intra prediction mode, a most probable mode (MPM) flag, an MPM index, motion information,
a merge mode flag,
a merge mode index, or
a quantization parameter (QP).

3. The method of claim 2, wherein the motion information comprises at least one of:
a motion vector, or
a reference index.

4. The method of claim 1, wherein the current block is a coding tree unit (CTU), or
wherein a size of the current block is N×M, and each of N and M is an integer, or
wherein a first block of the plurality of blocks is in a first CTU line different from a second block of the plurality of blocks, or
wherein a third block of the set of blocks is in a second CTU line different from a fourth block of the set of blocks, or
wherein a block of the plurality of blocks is a second CTU, or
wherein the block of the plurality of blocks has a predetermined size.

5. The method of claim 1, wherein determining the set of blocks comprises:
determining, for each of the plurality of blocks, a value of a proportion of target units in the respective block that are coded with a target mode; and
selecting the set of blocks from the plurality of blocks based on values of the proportion for the plurality of blocks.

6. The method of claim 5, wherein each target unit comprises one of: a sample, a coding unit (CU), or a prediction unit (PU), or
wherein the set of blocks comprises K blocks with top K largest values of the proportion, and K is an integer, or
wherein the set of blocks comprises K blocks with top K least values of the proportion, and K is an integer, or
wherein the target mode comprises one of: a merge mode, an intra mode, or an inter mode.

7. The method of claim 1, wherein determining the set of blocks comprises: determining, for each of the plurality of blocks, a first value of a first parameter based on a minimal value of QPs of CUs in the respective block; and selecting the set of blocks from the plurality of blocks based on values of the first parameter for the plurality of blocks, or
wherein determining the set of blocks comprises: determining, for each of the plurality of blocks, a second value of a second parameter based on a maximal value of the QPs of the CUs in the respective block; and selecting the set of blocks from the plurality of blocks based on values of the second parameter for the plurality of blocks, or
wherein determining the set of blocks comprises: determining, for each of the plurality of blocks, a third value of a third parameter based on an average value of the QPs of the CUs in the respective block; and selecting the set of blocks from the plurality of blocks based on values of the third parameter for the plurality of blocks.

8. The method of claim 1, further comprising:
obtaining, for the conversion between the current block of the video and the bitstream of the video, a merge list for the current block;
reordering merge candidates in the merge list based on coded information of the merge candidates; and
performing the conversion based on the reordered merge candidates.

9. The method of claim 8, wherein the merge list is an intra block copy (IBC) merge list, or
wherein the merge list is an inter merge list, or
wherein the coded information comprises at least one of:
a prediction mode,
an intra prediction mode,
a most probable mode (MPM) flag,
an MPM index,
motion information,
a merge mode flag,
a merge mode index, or
a quantization parameter (QP).

10. The method of claim 8, wherein the merge candidates are reordered based on a statistical process and the coded information.

11. The method of claim 10, wherein a counter for the statistical process is assigned to each of a plurality of units in one of:
a slice of the video,
a tile of the video,
a frame of the video, or
a picture of the video.

12. The method of claim 11, wherein each of the plurality of units comprises a block with a predetermined size, or
wherein the plurality of units are used to store motion information, or
wherein a value of the counter is set to a first predetermined value for initialization, or
wherein if a first merge candidate is selected for a first unit of the plurality of units, a value of the counter for the first unit is determined based on a sum of a second predetermined value and a value of the counter for a unit corresponding to the first merge candidate, or
wherein if the first merge candidate is selected for the first unit of the plurality of units and the first unit is coded with a skip mode or a merge mode, the value of the counter for the first unit is determined based on the sum of the second predetermined value and the value of the counter for the unit corresponding to the first merge candidate, or
wherein values of counters of all units in a respective block of the video are a same value, or
wherein if the block of the video is coded without the skip mode and the merge mode, the values of the counters of all units in the block are set to a third predetermined value.

13. The method of claim 11, wherein a position of a merge candidate in the merge list is dependent on a value of a counter of a unit corresponding to the merge candidate.

14. The method of claim 13, wherein the merge candidates in the merge list are reordered based on values of counters for units corresponding to the merge candidates, or
wherein the merge candidates in the merge list comprise a second merge candidate and a third merge candidate, if a value of a counter for a unit corresponding to the second merge candidate is smaller than the third merge candidate, the second merge candidate precedes the third merge candidate in the merge list.

15. The method of claim 1, wherein the method is applied to inter merge coding or reference picture management.

16. The method of claim 1, wherein whether to and/or how to apply the method is dependent on at least one of:
video contents of the video,
a message comprised in a DPS,
a message comprised in an SPS,
a message comprised in a VPS,
a message comprised in a PPS, a message comprised in an APS,
a message comprised in a picture header,
a message comprised in a slice header,
a message comprised in a tile group header,
a message comprised in an LCU,
a message comprised in a CU,
a message comprised in an LCU row,
a message comprised in a group of LCUs,
a message comprised in a TU,
a message comprised in a PU,
a dimension of the current block,
a dimension of a neighboring block of the current block,
a shape of the current block,
a shape of the neighboring block of the current block,
an indication of a color format of the video,
a coding tree structure associated with the current block,
a slice type associated with the current block,
a tile group type associated with the current block,
a picture type associated with the current block,
a color component of the current block,
a temporal layer ID of the current block,
a profile of a standard,
a level of the standard, or
a tier of the standard.

17. The method of claim 1, wherein the conversion includes encoding the current block into the bitstream, or wherein the conversion includes decoding the current block from the bitstream.

18. An apparatus for video processing comprising a processor and a non-transitory memory with instructions thereon, wherein the instructions upon execution by the processor, cause the processor to perform acts comprising:

determining, for a conversion between a current block of a video and a bitstream of the video, that a first prediction mode is applied to the current block;

deriving, in the first prediction mode, prediction samples of the current block based on reference values in a virtual buffer that are determined by a block vector for the current block, wherein the reference values in the virtual buffer are derived from blocks of sample values of a same video region of the current block;

performing the conversion based on the prediction samples;

determining a set of blocks from a plurality of blocks of the same video region based on coded information of the plurality of blocks, the plurality of blocks being coded before the current block; and updating the virtual buffer based on the set of blocks.

19. A non-transitory computer-readable storage medium storing instructions that cause a processor to perform acts comprising:

determining, for a conversion between a current block of a video and a bitstream of the video, that a first prediction mode is applied to the current block;

deriving, in the first prediction mode, prediction samples of the current block based on reference values in a virtual buffer that are determined by a block vector for the current block, wherein the reference values in the virtual buffer are derived from blocks of sample values of a same video region of the current block;

performing the conversion based on the prediction samples;

determining a set of blocks from a plurality of blocks of the same video region based on coded information of the plurality of blocks, the plurality of blocks being coded before the current block; and updating the virtual buffer based on the set of blocks.

20. A non-transitory computer-readable recording medium storing a bitstream of a video which is generated by a method performed by an apparatus for video processing, wherein the method comprises:

determining that a first prediction mode is applied to a current block of the video;

deriving, in the first prediction mode, prediction samples of the current block based on reference values in a virtual buffer that are determined by a block vector for the current block, wherein the reference values in the virtual buffer are derived from blocks of sample values of a same video region of the current block;

generating the bitstream based on the prediction samples;

determining a set of blocks from a plurality of blocks of the same video region based on coded information of the plurality of blocks, the plurality of blocks being coded before the current block; and updating the virtual buffer based on the set of blocks.

* * * * *